F. A. FISHER.
EMERGENCY VALVE.
APPLICATION FILED MAR. 23, 1914.
1,131,605.
Patented Mar. 9, 1915.
2 SHEETS—SHEET 1.
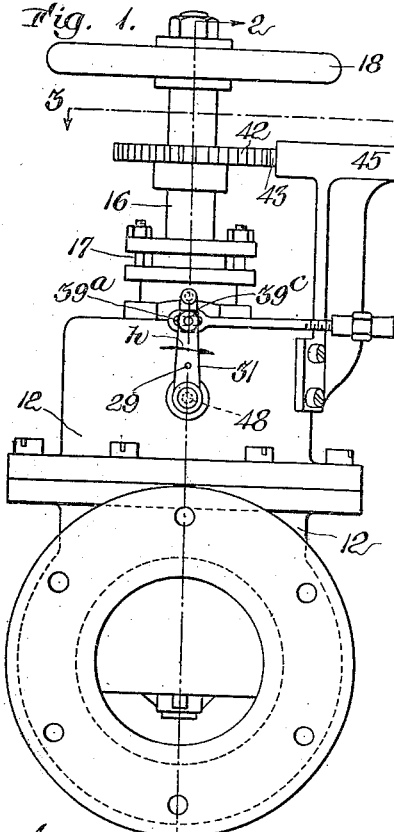
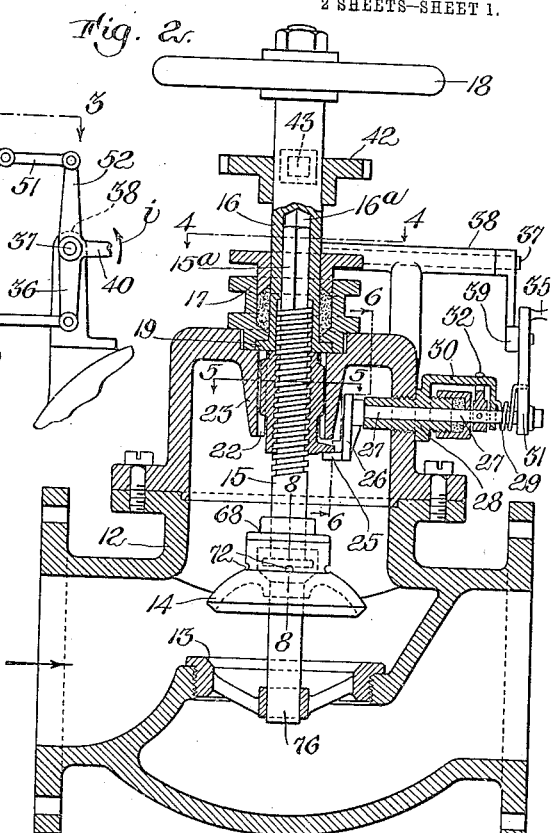
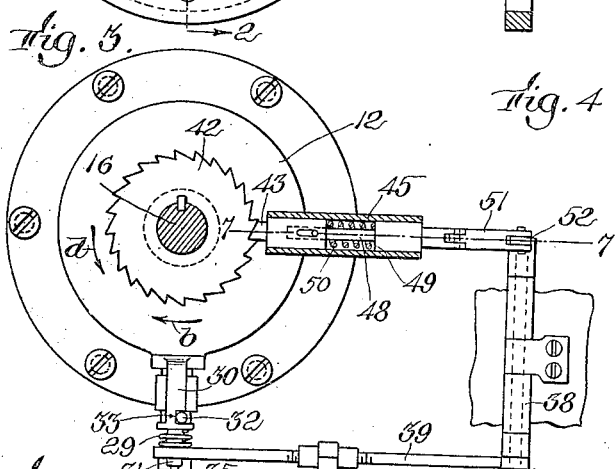
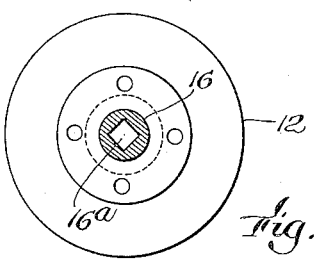
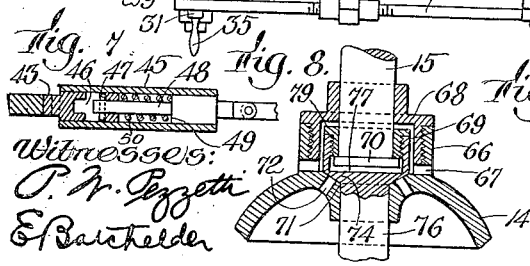
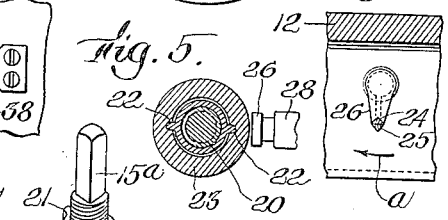
Witnesses:
P. W. Pezzetti
E. Batchelder
Inventor:
F. A. Fisher
by Wright, Brown, Quinby & May
attys.

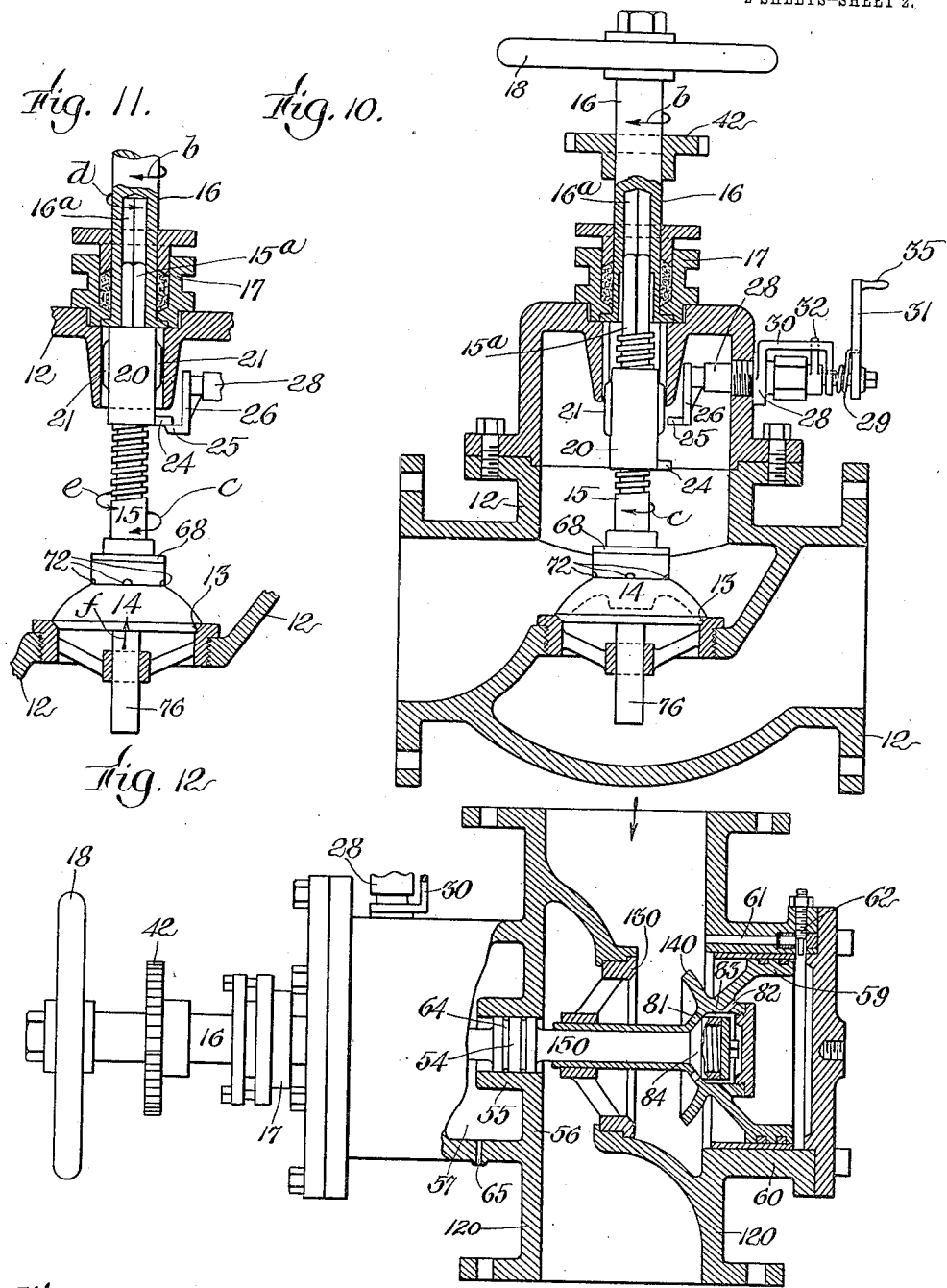

UNITED STATES PATENT OFFICE.

FREDERICK A. FISHER, OF PROVINCETOWN, MASSACHUSETTS, ASSIGNOR OF ONE-FOURTH TO WALTER L. CONWELL, JR., OF BOSTON, MASSACHUSETTS.

EMERGENCY-VALVE.

1,131,605.      Specification of Letters Patent.      Patented Mar. 9, 1915.

Application filed March 23, 1914. Serial No. 826,479.

*To all whom it may concern:*

Be it known that I, FREDERICK A. FISHER, a citizen of the United States, and resident of Provincetown, in the county of Barnstable and State of Massachusetts, have invented certain new and useful Improvements in Emergency-Valves, of which the following is a specification.

This invention relates to valves controlling the passage of steam or other fluid under pressure to an engine or other instrumentality which utilizes the pressure of the fluid, the valve including a casing having a valve seat, and a valve body which coöperates as usual with said seat in permitting and stopping the passage of the fluid.

The invention is embodied in a valve having a manually movable operating member external to the valve casing and rotatable without endwise movement relatively to the casing, a valve stem engaged with the valve body and longitudinally movable relatively to said casing and to the operating member, said valve stem and operating member being connected to rotate in unison, means within the casing actuated by the rotation of the operating member for moving the valve stem and valve body outwardly to open the valve, said valve opening means being contained entirely within the steam space of the casing and inherently free to move inwardly and close the valve, an automatically acting detent within the steam space for confining said valve stem and valve body at the limit of their outward movement, and a detent carrying member extending through the casing and forming a part of externally controlled means adapted to displace the detent and release the valve stem and valve body and permit the automatic closing of the valve either by gravity or by fluid or other pressure within the casing, so that the valve may be quickly and automatically closed in the event of an emergency requiring such closure.

Of the accompanying drawings forming a part of this specification; Figure 1 represents a side view of a valve embodying my invention, the valve body being adapted to be seated and close the valve by gravitation; Fig. 2 represents a longitudinal section of the same, the valve being open; Fig. 3 represents a section on line 3—3 of Fig. 1; Fig. 4 represents a section on line 4—4 of Fig. 2; Fig. 5 represents a section on line 5—5 of Fig. 2; Fig. 6 represents a section on line 6—6 of Fig. 2; Fig. 7 represents a section on line 7—7 of Fig. 3; Fig. 8 represents a section on line 8—8 of Fig. 2; Fig. 9 represents a perspective view of a portion of the inner valve stem member and the nut hereinafter referred to; Fig. 10 represents a view similar to Fig. 2, showing the valve closed, the nut being shown in elevation; Fig. 11 represents a view similar to parts of Fig. 10, showing the nut moved outwardly preparatory to the opening of the valve; Fig. 12 represents a view partly in elevation and partly in section, showing a valve body adapted to be closed by fluid pressure in the valve casing.

The same reference characters indicate the same or similar parts in all the views.

Referring to Figs. 1 to 11 inclusive, 12 represents the valve casing having a valve seat 13. 14 represents a valve body adapted to coöperate with said seat in opening and closing the valve. The term valve as used herein designates the structure which includes the casing, valve seat, and valve body. 15 represents a screw-threaded valve stem engaged with the valve body 14 and having a squared outer end portion 15ª said stem being entirely incased. 16 represents an operating member formed as a stem journaled in a bearing 17 formed as a stuffing box and attached to the casing, said operating member being provided with a squared socket 16ª in which the squared portion 15ª has a sliding fit, said socket and squared portion constituting means whereby the valve stem may be rotated by the rotation of the operating member and at the same time permitted to move longitudinally. The operating member 16 is rotatable in the bearing 17 by a hand wheel 18, and its endwise movement in the bearing is prevented by an annular flange 19 which is free to rotate between opposed fixed shoulders formed on the bearing and on the casing, as shown by Figs. 2, 10 and 11. 20 represents a nut threaded to engage the thread of the valve stem 15, and movable longitudinally without rotating, said nut being provided with longitudinal ears 21 which are movable in guide grooves 22 in a fixed sleeve 23 within the casing.

The nut 20 is movable outwardly, as hereinafter described, from the position shown by Fig. 10 to that shown by Figs. 11 and 2, and is automatically confined or locked at the limit of its outward movement by a detent 25 movably supported by the casing, and an ear 24 projecting laterally from the nut. Said detent is a finger formed on an arm 26 attached to a carrying member such as a rockshaft 27 journaled in a lateral bearing 28 which is formed as a stuffing box and extends through one side of the casing. The detent 25 is normally held yieldingly in the path of the nut ear 24, as indicated by Fig. 6, by a spring 29 coiled upon the rockshaft, one end of the spring being engaged with a fixed arm 30 on the bearing 28, and its other end with an arm 31 on the outer end of the rockshaft. A stop arm 32 attached to the rockshaft is held by the spring 29 against a fixed stop member 33 formed by the inner end of a slot in the arm 30, as shown by Fig. 3. The detent 25 is adapted to yield in the direction indicated by the arrow $a$ (Fig. 6) and its lower side and the upper side of the nut ear are provided with inclined faces so arranged that when the ear is moving outwardly its inclined face will coöperate with the inclined face of the detent in displacing the detent in the direction of the arrow $a$ (Fig. 6) until the ear passes above the detent, when the spring 29 will force the detent back to its normal position, the detent being thus caused to engage the nut ear and confine the nut at the limit of its outward movement.

The operation of the mechanism thus far described is as follows: The valve body being seated and the valve closed as shown by Figs. 10 and 11, the operating member is rotated in the direction indicated by the arrow $b$ (Figs. 3 and 11) and rotates the valve stem in the same direction as indicated by the arrow $c$ (Fig. 11), the valve body remaining seated and the valve stem being at the limit of its inward movement. The rotation of the valve stem causes the non-rotating nut 20 to move outwardly to the position shown by Fig. 11, until its movement is arrested by contact of its outer end with the inner end of the operating member. Just before this the ear 24 encounters and displaces the detent 25, as above described. The detent then springs back to its normal position and engages the ear 24 and confines the nut at the limit of its outward movement, as shown by Figs. 2, 6 and 11. The operator then rotates the operating member 16 in the opposite direction indicated by the arrow $d$ (Figs. 3 and 11). The valve stem is rotated in the same direction as indicated by arrow $e$, and is therefore caused to move outwardly in the now fixed nut, the valve body being thus moved from its seat in the direction indicated by arrow $f$ (Fig. 11) either to the extreme open position shown by Fig. 2 or to any less fully open position desired.

It will be seen that the operating member 16, the nut 20, and the valve stem 15 constitute a mechanism adapted to move the valve body outwardly from its seat by two successive operations, the first being the outward movement of the nut and the second the outward movement of the valve stem and valve body. It will also be seen that parts of said mechanism, viz., the nut, the valve stem and the valve body, are inherently free to move inwardly and close the valve, the only obstacle to such movement being the detent 25, consequently when the detent is displaced from the path of the nut ear 24, the valve body is closed on its seat by gravity.

The rockshaft arm 31 is preferably provided with a handle 35 to permit the convenient manual turning of the rockshaft against the pressure of the spring 29 to displace the detent. Said arm as here shown forms a part of means employed to transmit detent-displacing force to the rockshaft from an automatically operating device, such as a steam engine governor, not shown, located at a point more or less distant from the valve. Said force-transmitting means may also comprise a rockshaft 37 mounted to turn in a fixed bearing 38, and having an arm 36 connected by a rod 39 with the rockshaft arm 31, and an arm 40 which may be connected in any suitable way with the governor, or with any other distant means, either automatically or manually operated, to exert detent-displacing force. The governor may act centrifugally to move the arm 40 in the direction indicated by the arrow $i$ (Fig. 1) and thus cause the displacement of the detent.

When the nut is released by the detent and the valve body is closed on its seat, as shown by Fig. 10, the operating member 16 is locked against rotation in one direction, and permitted to rotate only in the direction indicated by the arrow $b$ and thus move the nut outward into engagement with the detent. This is accomplished by a ratchet-toothed wheel or annular ratchet 42 which is attached to the operating member and is engaged by a pawl 43, the ratchet and pawl being formed to permit the rotation of the operating member 16 in the direction indicated by the arrow $b$, and to prevent rotation in the opposite direction.

The pawl 43 is movable in a fixed tubular guide 45 and is provided with a slot 46 receiving a stop pin 47 on a slide 48 which is movable in said guide and has a shoulder 49 forming an abutment for one end of a spring 50, the other end of which bears on the pawl 43. The spring normally projects the pawl from the slide 48 as far as the slot 46 and pin 47 permit. The slide 48 is connected by a link 51 with an arm 52 on the rockshaft 37, said arm projecting oppositely from the arm 36. The pawl 43 is normally held in engagement with the ratchet 42 and, as above stated, permits the rotation of the operating member 16 in one direction. When the arm 40 is moved in the direction of arrow $i$ to displace the detent as described, the slide 48 is at the same time moved toward the ratchet by the arm 52 and link 51 and the pawl 43 is pressed against the ratchet 42. The valve body and nut are now in the position shown by Fig. 10, and the operating member and valve stem are rotatable only in the direction of the arrow $b$, because of the engagement of the pawl with the ratchet. After the nut has been moved outwardly by the rotation of the operating member and valve stem in direction of arrow $b$, the operator moves the arm 40 by hand in the direction opposite the arrow $i$, and thus sets the emergency mechanism for the next action of the governor and retracts the pawl 43 from the ratchet, so that the operating member is free to be rotated in the direction of arrow $d$ to open the valve. The rod 39 has a slot $39^a$ having a limited play on a pin $39^c$ on the arm 31, said slot and pin permitting the last described operation without disturbing or displacing the detent.

Fig. 12 shows my invention embodied in a valve the valve body 140 of which is movable horizontally toward and from its seat 130. The means for opening and permitting the closing of the valve are substantially the same as described with reference to Figs. 1 to 11, the only difference being the arrangement of the valve stem 150, which extends through the valve seat and is provided with a piston-like enlargement 54 having a sliding and practically steam-tight fit in a sleeve or guide 55 on a partition 56 which separates the conducting portion of the casing 120 from a chamber 57. Said chamber contains the nut 20 and the detent 25, and supports the bearing 17 in which the operating member 16 rotates. The valve body 140 is formed on a piston 59 which is movable in a cylinder 60 communicating with the casing 120. The area of the piston 59 is greater than that of the valve body 140, and the outer end of the piston is connected with the casing by a steam conduit 61 through which steam may pass to the outer end of the cylinder 60, said conduit having a regulating valve 62 whereby its conducting capacity may be varied. Sufficient steam may be admitted to the outer end of the cylinder 60 to overcome the pressure on the valve body 140 sufficiently to close the valve when the detent is displaced and the nut released, provision being thus made for closing the valve by fluid pressure instead of by gravity. The piston-like enlargement 54 has peripheral grooves 64 adapted to be packed by water of condensation or to receive expansible packings to prevent the escape of any objectionable quantity of steam into the chamber 57. Water of condensation, if any, in said chamber may escape through an outlet 65.

To facilitate the unseating of the valve body in each of the described embodiments of the invention I provide the valve body with by-passes and a by-pass valve adapted to equalize the pressure on each side of the valve body before it is unseated.

Fig. 8 shows the valve body 14 provided with an internally threaded neck 66 containing ports 67. A head 68 screwed into said neck forms a chamber 69. The valve stem 15 has a sliding fit in an orifice in the head 68, and is provided with a flange 70. The valve body 14 has a valve seat 71 at the inner end of the chamber 69 and ports 72 leading from said seat to the inner side of the valve body. The ports 67, chamber 69, and ports 72 form a by-pass from the outer to the inner side of the valve body.

74 represents a by-pass valve having a cavity 77 in which the flange 70 has a limited vertical play and a stem 76 having a sliding fit in a central orifice in the valve body. When the stem member 15 commences to move outwardly its flange 70 engages a gland 79 in the by-pass valve and lifts said valve and opens the by-pass, thus equalizing the steam pressure before the valve body 14 is lifted from its seat.

The by-pass shown by Fig. 12 is formed by ports 81 and 82 and a chamber 83, the ports 81 being formed in a by-pass valve seat at one end of said chamber. The by-pass valve 84 is adapted to play slightly in the chamber 83, and is caused to open the by-pass by a slight movement of the stem member 150 in one direction and to close the by-pass by a corresponding movement of said stem member in the opposite direction.

In each embodiment of the invention the valve stem turns freely in the valve body while the latter is seated, so that the seated valve body does not impede the rotation of the valve stem and operating member.

The part called the operating member 16 constitutes a manually operated means for rotating the valve stem 15. Said stem 15 has two functions, one of which is to move the nut outwardly to its confined position, and the other to coöperate with the confined nut in moving the valve body outwardly from its seat.

It will be seen that the valve stem 15 and nut 20 are in effect located entirely within the steam space of the valve casing (the outer portion of the valve stem being entirely incased by the bearing 17 and the operating member) and that the detent 25 is also located in said steam space. There is, therefore, no frictional resistance to the closing movement of the valve body such as would be involved by the movement of the valve stem through a stuffing box or other bearing on the casing closely fitting the valve stem. It will also be seen that the only external parts of the mechanism are the operating member 16, the outer end of the detent carrying member 27, and the devices which move said member. The valve casing is therefore relatively free externally from mechanism liable to derangement and the valve stem, nut and detent are entirely inclosed and protected.

Having described my invention, I claim:

1. In combination, a casing having a valve seat and a bearing for an operating member, a valve body coöperating with said seat, a screw-threaded valve stem engaged with the valve body, a nut located within the casing and engaged with said stem and provided with a laterally projecting ear, the casing and nut being provided with complemental means for permitting longitudinal movements and preventing rotation of the nut, an operating member external to the casing journaled to rotate without endwise movement in said bearing and engaged with the valve stem to rotate and permit longitudinal movement of the latter, the nut being movable outwardly independently of the valve body and valve stem by the rotation of the operating member in one direction, a detent within the casing adapted to automatically engage the nut ear and confine the nut at the limit of its outward movement, the nut when thus confined permitting the valve stem and valve body to be moved outwardly to open the valve by a rotation of the operating member in the opposite direction, the said nut, valve stem and valve body being movable in unison to permit the automatic closing of the valve when the detent is displaced, and externally controlled means for displacing the detent.

2. In combination, a casing having a valve seat and a bearing for an operating member, a valve body coöperating with said seat, a screw-threaded valve stem engaged with the valve body, a nut located within the casing and engaged with said stem and provided with a laterally projecting ear, the casing and nut being provided with complemental means for permitting longitudinal movements and preventing rotation of the nut, an operating member external to the casing journaled to rotate without endwise movement in said bearing and engaged with the valve stem to rotate and permit longitudinal movement of the latter, the nut being movable outwardly independently of the valve body and valve stem by the rotation of the operating member in one direction, a detent in the casing adapted to automatically engage the nut ear and confine the nut at the limit of its outward movement, and externally controlled means for displacing the detent to release the nut and permit the automatic closing of the valve.

3. In combination, a casing having a valve seat, an operating member bearing, and a lateral bearing, a valve body coöperating with said seat, a screw-threaded valve stem engaged with the valve body, a nut within the casing engaged with said stem and provided with a laterally projecting ear, the casing and nut being provided with complemental means for permitting longitudinal movements and preventing rotation of the nut, an operating member external to the casing, journaled to rotate without endwise movement in said operating member bearing and engaged with the valve stem to rotate and permit longitudinal movement of the latter, the nut being movable outwardly independently of the valve body and stem by the rotation of the operating member in one direction, and a detent carrying member movable in the said lateral bearing and having a detent located within the casing and yieldingly held in the path of the nut ear, said detent being adapted to engage said ear and confine the nut at the limit of its outward movement, and means for moving said detent carrying member to displace the detent and release the nut.

4. In combination, a casing having a valve seat, an operating member bearing and a lateral bearing, a valve body coöperating with said seat, a screw-threaded valve stem engaged with the valve body, a nut within the casing engaged with said stem and provided with a laterally projecting ear, the casing and nut being provided with complemental means for permitting longitudinal movements and preventing rotation of the nut, an operating member external to the casing, journaled to rotate without endwise movement in said operating member bearing and engaged with the valve stem to rotate and permit longitudinal movement of the latter, the nut being movable outwardly independently of the valve body and valve stem by the rotation of the operating member in one direction, and a detent carrying member journaled in the said lateral bearing and having a detent which is yieldingly held in the path of the nut ear and is adapted to engage said ear and confine the nut at the limit of its outward movement, and operating means connected with said detent carrying member whereby said member may be moved by force transmitted from a distant point.

5. A valve comprising a casing having a valve seat and an operating member bearing, a valve body coöperating with said seat, a screw-threaded valve stem engaged with the valve body, a nut engaged with said stem and provided with a laterally projecting ear, the casing and nut being provided with complemental means for permitting longitudinal movements and preventing rotation of the nut, an operating member journaled to rotate without endwise movement in said bearing and engaged with the valve stem to rotate and permit longitudinal movement of the latter, the nut being movable outwardly independently of the valve body and valve stem and normally free to move inwardly with the valve stem and valve body to close the valve, and means for preventing rotation of the operating member in one direction when the valve is closed, said means including an annular ratchet attached to the operating member and a spring-pressed pawl normally engaging said ratchet and adapted to permit its rotation in one direction only, said pawl being displaceable from the ratchet.

6. A valve comprising a casing having a valve seat and an operating member bearing, a valve body coöperating with said seat, a screw-threaded valve stem engaged with the valve body, a nut engaged with said stem and provided with a laterally projecting ear, the casing and nut being provided with a complemental means for permitting longitudinal movements and preventing rotation of the nut, an operating member journaled to rotate without endwise movement in said bearing and engaged with the inner stem to rotate and permit longitudinal movement of the latter, the nut being movable outwardly independently of the valve body and valve stem and normally free to move inwardly with the valve stem and valve body to close the valve, means for preventing rotation of the operating member in one direction when the valve is closed, said means including an annular ratchet attached to the operating member and a spring-pressed pawl normally engaging said ratchet and adapted to permit its rotation in one direction only, said pawl being displaceable from the ratchet, and manually movable means for displacing the pawl.

7. A valve comprising a casing having a valve seat and an operating member bearing, a valve body coöperating with said seat, a screw-threaded inner stem engaged with the valve body, a nut engaged with said stem and provided with a laterally projecting ear, the casing and nut being provided with complemental means for permitting longitudinal movements and preventing rotation of the nut, an operating member journaled to rotate without endwise movement in said bearing and engaged with the valve stem to rotate and permit longitudinal movement of the latter, the nut being movable outwardly independently of the valve body and valve stem by the rotation of the operating member in one direction, and a rock shaft journaled in the casing and having a detent which is yieldingly held in the path of the nut ear and is adapted to engage said ear and confine the nut at the limit of its outward movement, said rockshaft having at its outer end an arm whereby it may be turned to displace the detent and release the nut, an annular ratchet attached to the operating member, a spring-pressed pawl adapted to engage said ratchet and permit its rotation in one direction only, and mechanism for simultaneously displacing the detent and pressing the pawl against the ratchet, said mechanism being operable by hand to displace the pawl without displacing the detent.

8. In combination, a casing having a valve seat, a valve body coöperating with said seat, valve opening mechanism including a non-rotating longitudinally movable nut, a threaded stem engaged with the valve body and with said nut, said nut and stem being located within the steam space of the casing, and a manually operated stem-rotating member external to the casing and adapted to rotate the threaded stem in one direction to move the nut outwardly relatively to the valve body, and in the opposite direction to move the valve body and stem outwardly relatively to the nut, a detent within the steam space adapted to confine the nut at the limit of its outward movement, and externally operated means for displacing the detent.

9. In combination, a valve casing having a valve seat and an end bearing, an operating member external to the casing and journaled to rotate without endwise movement in said bearing, a valve body adapted to close said seat, a threaded valve stem engaged with the valve body and having a sliding interlocking engagement with the operating member, a nut engaged with the valve stem and having a sliding interlocking engagement with the casing, said valve stem and nut being inclosed by the casing and operating member, operable by said member to move the valve body from its seat, and inherently free to move with the valve body from the open position of the latter, a detent inclosed by the casing and adapted to automatically engage said nut and hold the valve body away from its seat, and means for displacing said detent and permitting a movement of the valve body to its seat.

10. In combination, a valve casing having a valve seat, an end bearing and a lateral bearing, an operating member external to the casing and journaled to rotate without endwise movement in said end bearing, a valve body adapted to close said seat, a threaded valve stem engaged with the valve body and having a sliding interlocking engagement with the operating member, a nut having a sliding interlocking engagement with the casing, said valve stem and nut being inclosed by the casing and operating member, operable by said member to move the valve body from its seat and inherently free to move with the valve body from the open position of the latter, a detent inclosed by the casing and adapted to engage said nut and hold the valve body away from its seat, a detent-carrying member movable in said lateral bearing and normally holding the detent in engagement with the nut, and means for moving said member to displace the detent.

11. In combination, a casing, a valve seat, a valve body coöperating with said seat, valve-body-operating mechanism including, first, relatively movable internal parts located within the casing and interengaged for simultaneous movement, and secondly, a manually operated external operating member, and an automatically operating externally controlled detent within the casing, one of said internal parts being movable by the said operating member into engagement with said detent, the said internal parts being operable by the operating member to move the valve body to and from its seat when one of said internal parts is engaged by the detent, and the said internal parts being inherently free to move in unison with the valve body toward the seat from an open position of the valve body when the detent is displaced.

In testimony whereof I have affixed my signature, in presence of two witnesses.

FREDERICK A. FISHER.

Witnesses:
WALTER L. CONWELL, Jr.,
C. F. BROWN.